United States Patent
Saxena et al.

(10) Patent No.: US 12,177,293 B2
(45) Date of Patent: Dec. 24, 2024

(54) VIDEO SURVEILLANCE SYSTEMS USING OUT OF BAND KEY EXCHANGE

(71) Applicant: Western Digital Technologies, Inc., San Jose, CA (US)

(72) Inventors: Vishwas Saxena, Bangalore (IN); Mukesh Kumar P, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 406 days.

(21) Appl. No.: 17/852,709

(22) Filed: Jun. 29, 2022

(65) Prior Publication Data

US 2024/0007523 A1    Jan. 4, 2024

(51) Int. Cl.
*H04L 67/104*   (2022.01)
*H04L 9/08*   (2006.01)
*H04L 9/40*   (2022.01)
*H04N 7/18*   (2006.01)

(52) U.S. Cl.
CPC .......... *H04L 67/104* (2013.01); *H04L 9/0825* (2013.01); *H04L 9/0838* (2013.01); *H04L 9/0861* (2013.01); *H04L 63/061* (2013.01); *H04L 63/166* (2013.01); *H04N 7/181* (2013.01)

(58) Field of Classification Search
CPC ... H04L 67/104; H04L 9/0825; H04L 9/0838; H04L 9/0861; H04L 63/061; H04L 63/166; H04N 7/181
See application file for complete search history.

(56) References Cited

U.S. PATENT DOCUMENTS

| | | | |
|---|---|---|---|
| 7,206,853 B2 | 4/2007 | Eytchison et al. | |
| 7,213,143 B1 | 5/2007 | Watson et al. | |
| 7,979,519 B2 | 7/2011 | Shigeta et al. | |
| 8,196,186 B2 | 6/2012 | Mityagin et al. | |
| 8,726,327 B2 | 5/2014 | Miao et al. | |
| 9,338,192 B1 | 5/2016 | He et al. | |
| 11,115,628 B2 * | 9/2021 | Phillips | G08B 13/19621 |
| 11,457,073 B1 | 9/2022 | Pilkauskas et al. | |
| 11,621,986 B2 | 4/2023 | Saxena | |
| 2009/0313290 A1 | 12/2009 | Narayanan et al. | |
| 2012/0173748 A1 | 7/2012 | Bouazizi | |
| 2012/0246202 A1 | 9/2012 | Surtani et al. | |
| 2016/0036943 A1 | 2/2016 | Kish et al. | |
| 2016/0373418 A1 * | 12/2016 | Ståhl | G06F 21/44 |

(Continued)

FOREIGN PATENT DOCUMENTS

| | | | | |
|---|---|---|---|---|
| EP | 3672232 B1 * | 11/2020 | ....... | G08B 13/19656 |
| WO | WO-2022189787 A1 * | 9/2022 | ......... | H04L 63/0428 |

*Primary Examiner* — Hee K Song
(74) *Attorney, Agent, or Firm* — Patent Law Works LLP

(57) ABSTRACT

Systems and methods for peer-to-peer video streaming from an edge data storage device to a browser are described. A surveillance video camera may establish a secure peer-to-peer connection using a first data transfer protocol with a user device. Once the secure peer-to-peer connection is established with the user device, out of band key exchange may occur through the peer-to-peer connection. Then, a shared key may be generated at both the video camera and the user device such that a request for media from the user device may be sent to a relay server over a second data transfer protocol. The video camera may then send an encrypted data file responsive to the media request over the second data transfer protocol to the relay server.

20 Claims, 10 Drawing Sheets

(56) References Cited

U.S. PATENT DOCUMENTS

| | | |
|---|---|---|
| 2017/0054687 A1 | 2/2017 | Ishigaki et al. |
| 2017/0264919 A1 | 9/2017 | Amine |
| 2019/0282897 A1 | 9/2019 | Posin |
| 2019/0342364 A1 | 11/2019 | Vysotsky |
| 2022/0107994 A1 | 4/2022 | Bernardi |
| 2022/0337891 A1 | 10/2022 | Burnley |
| 2023/0216947 A1* | 7/2023 | Bernardi ................ H04L 67/10 713/150 |

* cited by examiner

VIDEO SURVEILLANCE SYSTEMS USING OUT OF BAND KEY EXCHANGE

TECHNICAL FIELD

The present disclosure generally relates to video surveillance systems and, more particularly, to secure end-to-end encryption using out of band key exchange for video camera surveillance systems.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute and storage resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. These smart video cameras may include in camera storage, such as secure digital (SD) cards, and store the video data they generate for real-time or later viewing, analysis, and/or archiving. In some system configurations, user devices, such as personal computers and mobile devices, may be used to access video camera features and video data, sometimes using a video surveillance as a service (VSaaS) server accessible over the internet as an intermediary. For example, a VSaaS server may selectively download or stream video data from the video cameras, store the video data in network storage, and serve the video data through a hypertext transfer protocol (HTTP) live streaming (HLS) server supported by cloud HTTP secure (HTTPS) content delivery network (CDN) servers. However, this can be an expensive and inefficient architecture for surveillance video content that may only need to support only a small number of viewers and rare repeat viewing.

It may be advantageous to provide peer-to-peer video data or other media streaming from edge data storage devices, such as surveillance video cameras. However, encrypting data transfers from such edge devices to user devices may require significant investment in time and resources to achieve. Additionally, some edge devices are intentionally hidden on secure networks behind gateways, routers, or other network address translation (NAT) devices, accessible only through local network addresses and port assignments. Dynamic domain name systems and port mapping for edge devices may increase security vulnerabilities and may not be desirable for some applications, such as video surveillance. Additionally, traditional methods of secure public key exchange, such as a quick response (QR) code, is not achievable with a video camera because the camera lacks an interface to expose the QR code for a client to scan and verify the integrity of the public keys shared.

Systems and methods for end-to-end encryption of data transfers from edge data storage devices to user devices using standard web protocols may be advantageous. A reliable and efficient way of establishing peer-to-peer connections for out of band key exchange for end-to-end encryption, particularly from edge video surveillance devices to user devices, may be needed.

SUMMARY

Various aspects for peer-to-peer media streaming from edge data storage devices used in video cameras to internet browsers and, more specifically, out of band key exchange for encrypting video surveillance data are described.

One general aspect includes a system that includes a video camera including: a processor; a memory; a network interface configured for communication over a network; a data storage device configured to store video data; and a surveillance controller, stored in the memory for execution by the processor. The surveillance controller is configured to: receive, from a user device through a relay server, a peer-to-peer connection request; establish, responsive to the peer-to-peer connection request, a connection to a signaling server, where the connection is configured for exchanging a connectivity configuration associated with opening a secure peer-to-peer channel between the user device and the video camera; establish the secure peer-to-peer channel with the user device; send a session identifier to the user device via the secure peer-to-peer channel; receive a signed session identifier from the user device; verify the signed session identifier; generate a camera public key associated with the user device; send, to the user device via the secure peer-to-peer channel, the camera public key; receive, from the user device via the secure peer-to-peer channel, a client public key; store, in the memory, the client public key in association with the camera public key; generate a shared key based on the camera public key and the client public key; and encrypt, using the shared key, requested video data from the video camera.

Implementations may include one or more of the following features. The system may include a registration module configured to receive a long-term device key from the user device upon installation, where the surveillance controller is further configured to verify the signed session identifier using the long-term device key. The system may include the user device configured to generate a long-term host key and the long-term device key upon registration and sign the session identifier using the long-term host key. The system may include the user device including a network server interface configured to: receive, from the relay server, a user device notification indicating a signaling server for establishing the secure peer-to-peer channel; receive, forwarded from the signaling server, an interactive connectivity establishment (ICE) configuration of the video camera; generate a responsive ice configuration; send the responsive ice configuration to the signaling server; receive exchanged candidates; and establish the secure peer-to-peer channel. The user device may include a video manager configured to: send a media request for a manifest file to the video camera via the relay server; receive data encrypted from the video camera via the relay server responsive to the media request; and decrypt the data using the shared key to extract the manifest file. The shared key may be generated using a key derivation function. The relay server may be configured to receive requests through a hypertext transfer protocol (HTTP). The network interface may be configured to receive network communication from a network address translation device using a local network address; and establishing the secure peer-to-peer channel may include establishing a secure datagram transport layer security (DTLS) protocol between the video camera and the user device. The surveillance controller may be further configured to, responsive to a request via the relay server: retrieve a manifest file from the data storage device; encrypt the manifest file using the shared key; and send the encrypted manifest file to the relay server. The relay server may include an authentication controller configured to authenticate the user device and the video camera to initiate the secure peer-to-peer channel.

Another general aspect includes a computer-implemented method including: establishing, between a video camera and a user device, a peer network connection using a datagram transport layer security (DTLS) protocol; sending an encrypted data transfer session request to the user device, receiving a signed session request from the user device, verifying the signed session request, generating a shared key with the user device, receiving a media request for a manifest file through a relay server in a hypertext transfer protocol (HTTP) request, retrieving the manifest file, encrypting the manifest file using the shared key, and sending the encrypted manifest file to the relay server in an HTTP response to the HTTP request.

Implementations may include one or more of the following features. The video camera may include: at least one image sensor configured to capture video images; a processor; a memory; a network interface configured for communication over a network; and a data storage device configured to store video data captured by the at least one image sensor, where the manifest file includes video data stored in the data storage device. The computer-implemented method may include: receiving, by the video camera, network communication from a network address translation device using a local network address for the video camera; and establishing, for the peer network connection, a secure socket between the video camera and the user device. Generating the shared key may include using a key derivation function. The computer-implemented method may include: exchanging, for the peer network connection, a plurality of combinations of network addresses and ports for the video camera and the user device; and implementing a transport layer security protocol compatible with the peer network connection. The computer-implemented method may include: receiving, by the relay server, a media connection request from the user device; authenticating, by the relay server, the media connection request based on at least one public key associated with the media connection request; determining, by the relay server and based on the media connection request, a target camera identifier from a plurality of camera identifiers supported by the relay server, where the target camera identifier corresponds to the video camera; sending, by the relay server and based on the media connection request, a user device notification to the video camera; and initiating, by the relay server, a signaling server to support negotiation of the peer network connection between the video camera and the user device. The computer-implemented method may include: determining, by the relay server, signaling channel information for a signaling channel; sending, by the relay server, the signaling channel information to the video camera and the user device; establishing, by the signaling server, the signaling channel for use by the video camera and the user device; and exchanging, by the signaling server, interactive connectivity establishment (ICE) configurations between the video camera and the user device. Retrieving the manifest file may be from a data storage device in the video camera and generating the shared key may be through an elliptic-curve Diffie-Hellman (ECDH) key exchange. The computer-implemented method may include: generating, by the user device, a long-term host key and a long-term device key upon registration; and receiving the long-term device key from the user device upon installation, where verifying the signed session request uses the long-term device key.

Still another general aspect includes a video camera including: a processor; a memory; a network interface configured for communication over a network; a data storage device configured to store video data; means for receiving, from a user device and through a relay server, a peer-to-peer connection request; means for establishing, responsive to the peer-to-peer connection request, a connection to a signaling server, where the connection is configured for exchanging a connectivity configuration associated with opening a secure peer-to-peer channel between the user device and the video camera; means for establishing the secure peer-to-peer channel with the user device; means for sending a session identifier to the user device via the secure peer-to-peer channel; means for receiving a signed session identifier from the user device; means for verifying the signed session identifier; means for generating a camera public key associated with the user device; means for sending, to the user device and via the secure peer-to-peer channel, the camera public key; means for receiving, from the user device and via the secure peer-to-peer channel, a client public key; means for storing, in the memory, the client public key in association with the camera public key; means for generating a shared key based on the camera public key and the client public key; and means for encrypting requested video data from the video camera using the shared key.

The various embodiments advantageously apply the teachings of computer-based video surveillance systems to improve the functionality of such computer systems and similar internet-of-things (IoT) computer systems with media streaming capabilities. The various embodiments include operations to overcome or at least reduce the issues previously encountered in surveillance systems and, accordingly, are more reliable and/or cost-efficient than other surveillance systems. That is, the various embodiments disclosed herein include hardware and/or software with functionality to improve peer-to-peer media streaming from an edge data storage device to a user device by establishing a secure socket connection using intermediaries, such as a VSaaS server and/or signaling server, to enable peer-to-peer streaming of video data across proxy servers on the edge data storage device and user device. Accordingly, the embodiments disclosed herein provide various improvements to network-based video surveillance systems and other IoT systems with media streaming needs.

It should be understood that language used in the present disclosure has been principally selected for readability and instructional purposes, and not to limit the scope of the subject matter disclosed herein.

DETAILED DESCRIPTION

Figure 1:
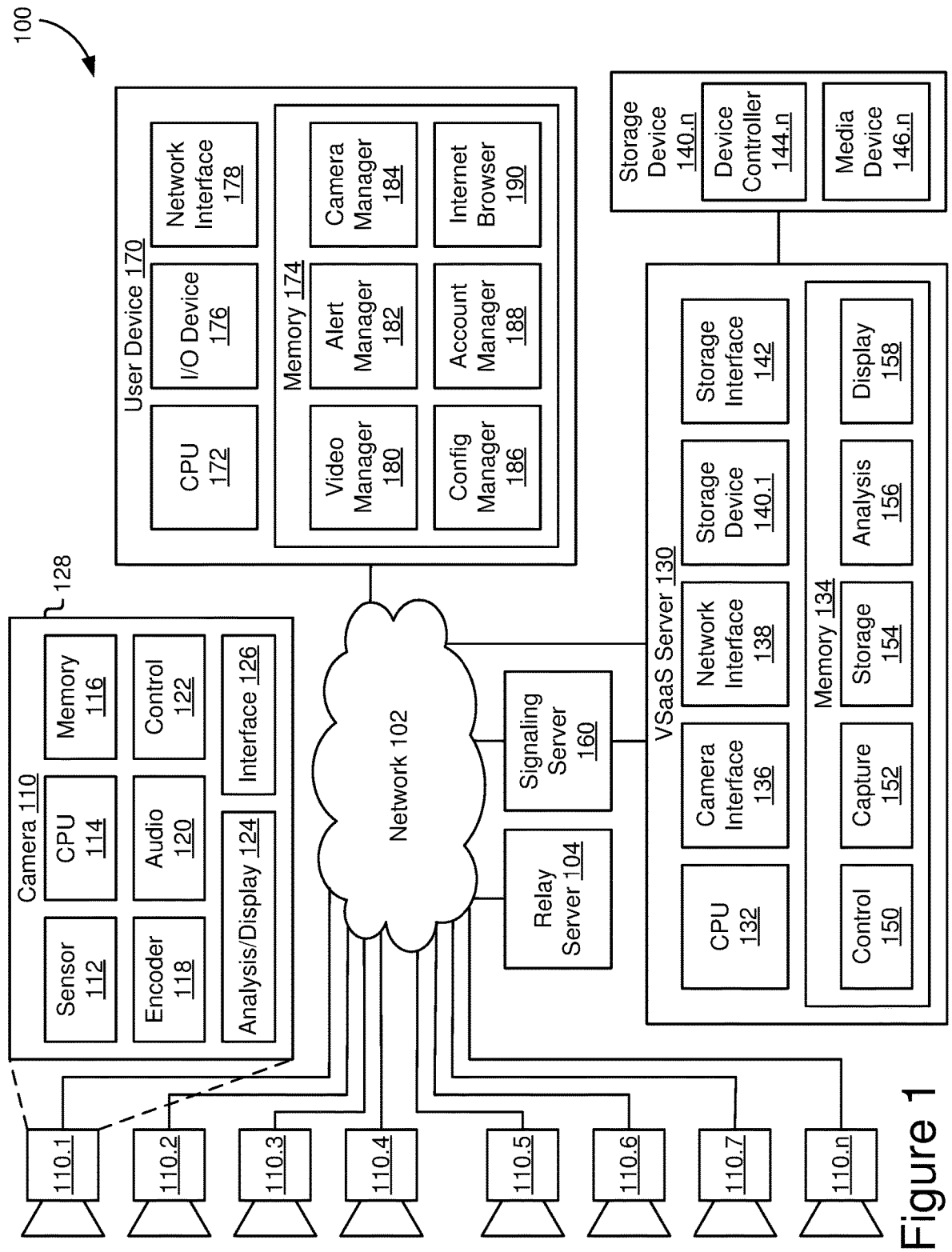
FIG. 1 schematically illustrates a computer-based surveillance system.

FIG. 1 shows an embodiment of an example video surveillance system 100 with multiple video cameras 110 interconnected to a video surveillance as a service (VSaaS) server 130 for display of surveillance video on user device 170. While some example features are illustrated, various other features have not been illustrated for the sake of brevity and so as not to obscure pertinent aspects of the example embodiments disclosed herein. In some embodiments, cameras 110, VSaaS server 130, and user device 170 are computer-based components that may be interconnected by a network 102. While the example embodiments shown may include video cameras 110, VSaaS server 130, and user device 170, a similar architecture may be employed for other IoT devices that include edge data storage devices for collecting media data and streaming the media data to a user device. Similarly, VSaaS server 130 may provide an example intermediary for establishing the peer-to-peer communication, but other intermediaries, including but not limited to independent signaling servers, gateway devices, cloud-based authentication services, and other networked computer-device accessible to the user device and the media device may provide similar functions.

In some embodiments, one or more networks 102 may be used to communicatively interconnect various components of surveillance system 100. For example, each component, such as cameras 110, VSaas server 130, network storage device 140.n, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and VSaas server 130, enabling VSaas server 130 to control access to cameras 110 and their video data. In some embodiments, cameras 110 may be configured on one or more local networks that access network 102 through a camera gateway/router or another NAT device. For example, cameras 110 may be configured with local network addresses for one or more ports connected to camera gateway/router through an ethernet or power-over-ethernet (PoE) LAN, and all internet communications to and from cameras 110 may pass through camera gateway/router (and firewall and security provisions thereof) to assure that individual cameras and their data are secure behind the internet protocol (IP) address of camera gateway/router.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to VSaaS server 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard video processing and/or streaming functions similar to (or supporting) the surveillance functions provided by VSaaS server 130 and/or a video surveillance application on user device 170. For example, video analysis/display subsystem 124 may include one or more functions similar to those described below for VSaaS server 130. In some embodiments, analysis/display subsystem 124 may include a media server function for peer-to-peer video streaming to user device 170 as further described below.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis/display subsystem 124, and/or a network interface 126 may comprise one or more application-specific integrated circuits (ASICs) mounted within a sealed plastic, metal, or similar housing 128 with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis/display subsystem 124, and/or network interface 126.

Digital video data from image sensor 112 may be received by processor 114 for storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110.

In some embodiments, memory 116 may include one or more on-board and/or in-camera data storage devices, such as disk drives (solid-state drives, hard disk drives, hybrid drives, tape drives, etc.), universal serial bus (USB) flash drives, secure digital (SD) cards or SD extended capacity (SDXC) cards, and/or other form factors. For example, video cameras 110 may each include a storage interface and data storage device, such as an SD card, configured to store video data captured by image sensor 112 and encoded by encoder 118 without relying on VSaaS server 130, network storage devices 140.n, a network video recorder (not shown), and/or other components of surveillance system 100 for primary video storage. In some embodiments, video data may be stored in memory 116 of video cameras 110.1-110.n and selectively provided to VSaaS server 130 and/or user device 170 to support off-camera analytics, selective storage of high-value video data (detected events and/or selected for archiving), serving video data for user display on user device 1702, etc. For example, memory 116 may be used to record video data according to a video capture loop, where the data storage device has a capacity for storing hours, days, or weeks of video data before overwriting previously recorded video data in the data storage device, and VSaaS server 130 and/or a surveillance application on user device 170 may selectively access and/or replicate video data from the video cameras during the moving window of the loop cycle before it is erased (and replaced by more recent video data). In some embodiments, analysis/display subsystem 124 may be configured to stream video data from memory 116 to VSaaS server 130 and/or user device 170.

Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some embodiments, the compressed video format may generate a compressed video data stream that uses variable compression to remove redundancies between video data frames. For example, use of variable compression may cause video captured during a fixed time window to occupy different sizes in memory (e.g., 2 megabytes (MB) of compressed video data versus 4 MB of compressed video data for a minute of recording using the same variable compression codec, depending on the compressibility of the video content captured during the one-minute time window).

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, VSaaS server 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable VSaaS server 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis/display subsystem 124 configured for onboard video analytics and/or selective display of video data to user device 170. For example, video analysis/display subsystem 124 may be configured to use processor 114 and memory 116 to execute at least a portion of video analytics and display for video data captured by video camera 110. In some embodiments, video analysis/display subsystem 124 may be configured to operate similarly to video analysis subsystem 156 and video display subsystem 158 in VSaaS server 130, as further described below. In some embodiments, video analysis/display subsystem 124 may be configured to support real-time image classification and object detection within camera 110 without processing support from VSaaS server 130. For example, video analysis subsystem 124 may receive a video stream (from sensor 112 and/or encoder 118), initiate an object detector to determine the object's position within the video frame (and/or subsequent video frames). In some embodiments, video analysis/display subsystem 124 may be configured to support real-time and/or request-based video streaming to user device 170 without the video data passing through VSaaS server 130. For example, once a peer-to-peer connection is established between camera 110 and user device 170, user device 170 may request target video data stored in memory 116 and analysis/display subsystem 124 may stream the video data directly to user device 170 through a proxy server configuration and secure socket connection between the devices.

Network interface 126 may include one or more wired or wireless connections to network 102 and/or a dedicated camera interface of a camera gateway/router. For example, network interface 126 may include an ethernet jack and corresponding protocols for IP communication with VSaaS server 130, a camera gateway/router (not shown), and/or a network video recorder (not shown). In some embodiments, network interface 126 may include a power over ethernet (PoE) connection with a camera access point or gateway. PoE may enable both power for camera 110 and network data to travel on the same wire. In some embodiments, network interface 126 may enable an IP camera to be configured as a network resource with an IP address that is accessible on a LAN, WAN, or the internet. For example, VSaaS server 130 and/or user device 170 may be configured to selectively receive video from cameras 110 from any internet-connected location using internet addressing and security protocols as further described below.

VSaaS server 130 may include a computer system configured as a video storage device or interface to a network video storage device to selectively receive the video streams from cameras 110. For example, VSaaS server 130 may be configured to receive video streams from each of cameras 110 for selective storage, analysis, and/or display through user device 170. In some embodiments, some or all of the functions of VSaaS server 130 may be embodied in a network video recorder collocated with some or all of cameras 110 and/or a proprietary network video server specifically configured to support cameras 110. In some embodiments, cameras 110 may send encoded video streams based on the raw image data collected from their respective image sensors 112, with or without video data compression.

A single video stream may be received from each camera 110 and VSaaS server 130 may be configured to receive video streams from all connected cameras in parallel, as network bandwidth and processing resources allow.

VSaaS server 130 may include one or more server devices and/or associated network storage devices 140.*n*, where each server device includes at least one processor 132, at least one memory 134, at least one storage device 140, and at least one interface, such as camera interface 136, network interface 138, and/or storage interface 142. A plurality of VSaaS servers 130 may be configured for mounting within rack systems and maintained in a data center that is remote from cameras 110 and/or geographically distributed among a number of data centers in geographic locations for distributed, cloud-based surveillance services. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, VSaaS server 130 may interface with a local gateway/router or network video recorder that includes camera interface 136 configured for connection with one or more cameras 110. For example, camera interface 136 may include a plurality of ethernet ports and supporting protocols compatible with PoE standards for connecting to cameras 110.5-110.*n*. In some embodiments, camera interface 136 may include a PoE network switch for providing power to connected cameras and routing data packets to and from cameras 110.5-110.*n*, such as control and video data. In some embodiments, VSaaS server 130 may not include a camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, VSaaS server 130 may include internal storage device 140.1 and expandable storage or access to network storage that enables additional storage devices 140.*n* to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type. In some embodiments, data storage devices used for video data storage in cameras 110 may be configured similarly to storage devices 140.*n*.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.*n*. In some embodiments, storage interface 142 may include a wireless data connection with sufficient bandwidth for video data transfer. Depending on the configuration and protocols used by storage interface 142, storage device 140.*n* may include a corresponding interface adapter, firmware, and/or protocols for receiving, managing, and responding to storage commands from VSaaS server 130.

VSaaS server 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to VSaaS server 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to a network video recorder or VSaaS server 130. Video capture subsystem 152 may be configured to pass each received video stream and/or selected video portions thereof to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or other network video storage for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video storage subsystem 154 may be configured to rely on in-camera storage (e.g., memory 116 and/or data storage devices therein) for primary storage of the captured video streams and selectively archive video data of particular interest, such as video data portions flagged by in-camera analysis/display subsystem 124 and/or analysis subsystem 156 as containing particular objects, events, or other parameters. In some embodiments, cameras 110 may be configured to send parity data, backup video data, and/or parity management logs to VSaaS server 130 for storage through video storage subsystem 154. This selectively offloaded data from cameras 110 may support parity-based redundant storage among a group of video cameras. In some embodiments, video storage subsystem 154 may also include logic for recovering video data in the event of a storage failure by one or more of cameras 110. For example, video storage subsystem 154 may access parity management logs to determine the location of source video data blocks and corresponding parity blocks needed to recover the source video data of the lost camera, as well as initiate and oversee the data recovery process to storage device 140.$n$ and/or to a replacement camera 110 or storage device therein (such as a replacement SD card).

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding video metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to a network video recorder and/or via network 102 within a LAN, WAN, VPN, or the internet.

In some embodiments, surveillance system 100 may include a relay server 104 used as a relaying intermediary for establishing secure peer-to-peer network connections, such as between a target video camera 110 and user device 170. The relay server 104 may also be used to receive and relay requests for media after the out of band key exchange occurs to facilitate data transfer of encrypted video data with a shared key between the target video camera 110 and user device 170. In some embodiments, relay server 104 may be integrated in VSaaS server 130 and/or may be authenticated and initiated by VSaaS server 130. Additionally, in other embodiments, relay server 104 may be integrated in the target video camera 110 and/or may be authenticated and initiated by the target video camera 110.

In some embodiments, surveillance system 100 may include a signaling server 160 used as a signaling intermediary for establishing secure peer-to-peer network connections, such as between a target video camera 110 and user device 170, despite the target video camera being behind a NAT device. For example, signaling server 160 may be configured to establish a signaling room for receiving and forwarding handshakes (offers and answers) from the respective endpoints (camera and user device) and enabling exchange and negotiation of a connection session. In some embodiments, signaling server 160 may act as a handshake relay for session description protocol (SDP) offers and answers and facilitate interactive connectivity establishment (ICE) negotiation by enabling the exchange of candidate network addresses and port information. For example, use of signaling server 160 may enable cameras 110 and user device 170 to establish secure peer network connections by defining hole punching socket connections between the devices that support datagram transport layer security (DTLS) protocol over user datagram protocol (UDP). In some embodiments, signaling server 160 may be integrated in VSaaS server 130 and/or may be authenticated and initiated by VSaaS server 130.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for VSaaS server 130. In some embodiments, user device 170 may be configured to access cameras 110 and/or their respective video streams through VSaaS server 130 and/or directly through network 102. In some embodiments, one or more functions of VSaaS server 130 may be instantiated in user device 170 and/or one or more functions of user device 170 may be instantiated in VSaaS server 130 and/or a network video recorder (not shown).

User device 170 may include one or more processors 172 for executing compute operations or instructions stored in memory 174 for accessing video data and other functions of VSaaS server 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include an account manager 188 configured to provide a user interface for identifying, configuring, and managing a secure user account for VSaaS server 130. Memory 174 may include an internet browser 190 configured to provide a user interface and network interface application to access network resources, such as VSaaS server 130 and/or cameras 110. In some embodiments, internet browser 190 and related protocols may provide the application platform for the other modules or subsystems.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video analysis/display subsystem 124 of a target video camera 110, video display subsystem 158, and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Account manager 188 may include interface protocols and a set of functions and parameters for identifying, configuring, and managing access to VSaaS server 130. For example, each of camera manager 184, configuration manager 186, and/or account manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or account manager 188 may provide changes parameters to the effected components, such as camera manager 184 sending camera configuration parameter changes to selected cameras 110, account manager 188 sending VSaaS account configuration parameter changes to VSaaS server 130, and/or configuration manager 186 sending system configuration parameter changes to all effected components.

In some embodiments, internet browser 190 may include interface protocols and a set of functions and parameters for supporting other applications or functions based on local or remote web applications or web pages. For example, internet browser 190 may use IP addressing, domain name system (DNS), and/or other uniform resource locators (URLs) to locate and access web servers (including local, remote, and cloud servers) over standard internet protocols, such as transport control protocol (TCP)/internet protocol (IP), HTTP, HTTPS, etc. In some embodiments, internet browser 190 may be configured to parse web pages or applications using hypertext markup language (HTML) to access and display graphical elements and file data. For example, HTML 5 may support video elements that enable the display of video objects (similar to prior video content support from plugins). In some embodiments, internet browser 190 may be configured to receive manifest files describing video or other media metadata to provide media data selection and navigation features, such as time-based navigation of a video stream, and receive transport stream or other video data formats for displaying video data through I/O device 176, such as a graphical user display and speakers. Internet browser 190 may include APIs for expanding browser functions using plug-ins, but the use of plug-ins may be limited in some environments. In some embodiments, internet browser 190 may access local resources within user device 170 through proxy applications (or daemons) that mimic the interface and operations of a web server. For example, a proxy server in memory 174 may be configured to receive HTTP or HTTPS requests and provide response messages according to HTTP/HTTPS and TCP/IP data transfer and transport protocols back to internet browser. In some embodiments, proxy servers may be configured to further interface with other network resources over network interface 178 and network 102. For example, proxy servers may be configured to provide protocol translation and/or other interface support to enable internet browser 190 to communicate with other network resources without those resources having to comply with the HTTP/HTTPS and/or TCP/IP protocol standards used by internet browser 190.

Figure 2:
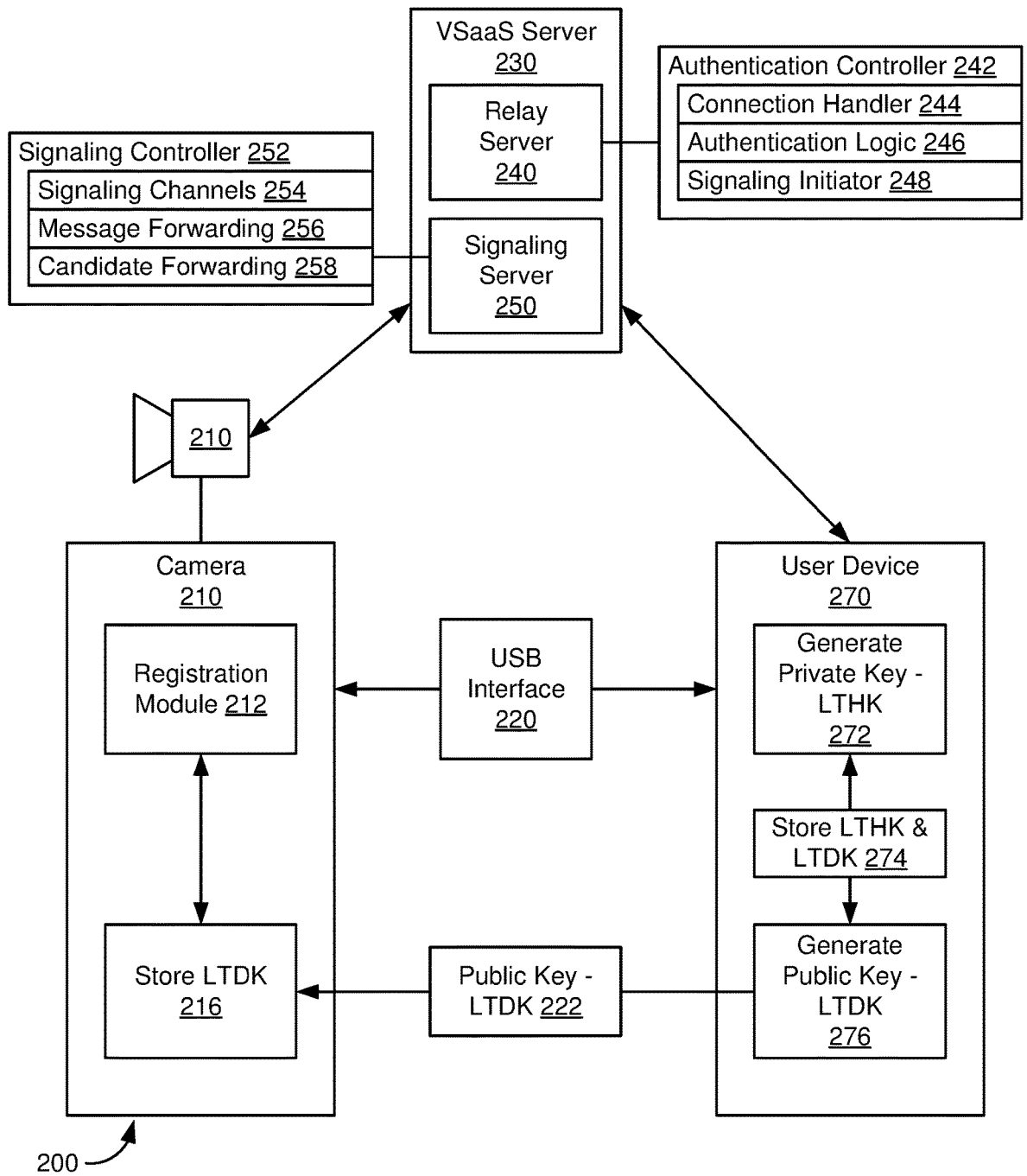
FIG. 2 schematically illustrates an example configuration for registering a video camera with a user device in a computer-based surveillance system, such as the computer-based surveillance system of FIG. 1.

FIG. 2 shows selected elements of a computer-based surveillance system 200, such as surveillance system 100 in FIG. 1, configured for registering a video camera 210 and user device 270, connected through a USB interface 220 during registration. FIG. 2 also shows a VSaaS server 230 used as an intermediary for later establishing a secure peer-to-peer connection for out of band key exchange. In some embodiments, camera 210 may be configured similarly to cameras 110, VSaaS server 230 may be configured similarly to VSaaS server 130, and user device 270 may be configured similarly to user device 170, as shown in FIG. 1. For example, registration module 212 may store a long term device key (LTDK) 216 in memory 116 configured for execution by processor 114, relay server 240 and signaling server 250 may be configured as subsystems in memory 134 for execution by processor 132, and private key (long term host key (LTHK)) 272 and public key (long term device key (LTDK)) 276 may be stored in memory 174 for execution by processor 172. In configurations with multiple cameras 210 and/or user devices 270, each media device and user device may include or be assigned a unique identifier.

Camera 210 may include registration module 212 configured to facilitate a registration process with the user device 270 through a USB interface 220. Upon setup and installation of the camera 210, the registration module 212 may enable the user device 270 to generate a private key, or long-term host key (LTHK) 272 and generate a public key, or long-term device key (LTDK) 276 and store both LTHK and LTDK 274 at the user device 270.

Later, camera 210 and user device 270 may attempt to establish a peer network connection via VSaaS server 230. For example, camera 210 and user device 270 may attempt to establish a peer network connection through a relay server 240 and subsequently through a signaling server 250. An established peer network connection enables secured data transfer for out of band key exchange between camera 210 and user device 270. One or more intermediaries, such as VSaaS server 230, may be used to establish contact and negotiate the secure peer network connection. For example, VSaaS server 230 may have been previously configured for secure network communication with camera 210 when surveillance system 200 was installed or initialized. Similarly, user device 270 may include a URL and account information for reaching VSaaS server 230 to support one or more functions of a surveillance application, such as a browser-based surveillance application running on an internet browser on the user device 270. In some embodiments, user device 270 may initiate a peer network connection with one or more surveillance cameras associated with VSaaS server 230, including camera 210. For example, a user of user device 270 may select camera 210 and/or a target video segment recorded by camera 210, based on a video timestamp, using a video manager function (as described above for video manager 180). In some embodiments, user device 270 may configure peer network connections for each video camera associated with the surveillance system during an installation or configuration operation. In some embodiments, user device 270 may configure peer network connections on demand when a target camera or video data segment is selected that resides in on-camera storage.

In some embodiments, VSaaS server 230 may include or access a relay server configured to receive an initial media connection request from user device 270. For example, relay server 240 may include an authentication controller 242 stored in memory for execution by a processor of VSaaS server 230. In some embodiments, authentication controller 242 may include one or more functions or modules instantiated in logic or instructions for execution by the processor. For example, connection handler 244 may include logic to receive connection requests from user devices, such as user device 270. Authentication logic 246 may include logic to determine user credentials and/or other authentication information and determine whether user device 270 and/or an associated user account is configured for access to camera 210. If user authentication is successful, signaling initiator 248 may include logic to initiate a signaling channel and/or session in signaling server 250 and send signaling channel information to both user device 270 and camera 210 for accessing signaling server 250. Operation of authentication controller 242 may be further explained below with regard to FIGS. 4*a* and 4*b*.

In some embodiments, VSaaS server 230 may include or access a signaling server 250 configured to oversee handshaking and negotiation of the peer network connection between camera 210 and user device 270. For example, signaling server 250 may include a signaling controller 252 stored in memory for execution by a processor of VSaaS server 230. In some embodiments, signaling controller 252 may include one or more functions of modules instantiated in logic or instructions for execution by the processor. For example, signaling channels 254 may include specific resource locators and credentials for a signaling room allocated to resolving the media connection request between camera 210 and user device 270. Message forwarding 258 may include logic for receiving handshake messages, such as connection offer messages and connection answer messages, and forwarding them from one endpoint to another, such as from camera 210 to user device 270 or from user device 270 to camera 210. Candidate forwarding 258 may include logic for facilitating the exchange of network address and/or port information between the endpoints in order to determine candidates for interactive connectivity establishment (ICE) negotiations. Once ICE negotiations are complete, a secure socket connection between camera 210 and user device 270 may be established and signaling server 250 may no longer be involved in communication between the devices. Operations of signaling server 250 may be further explained below with regard to FIGS. 4*a* and 4*b*.

Figure 3:
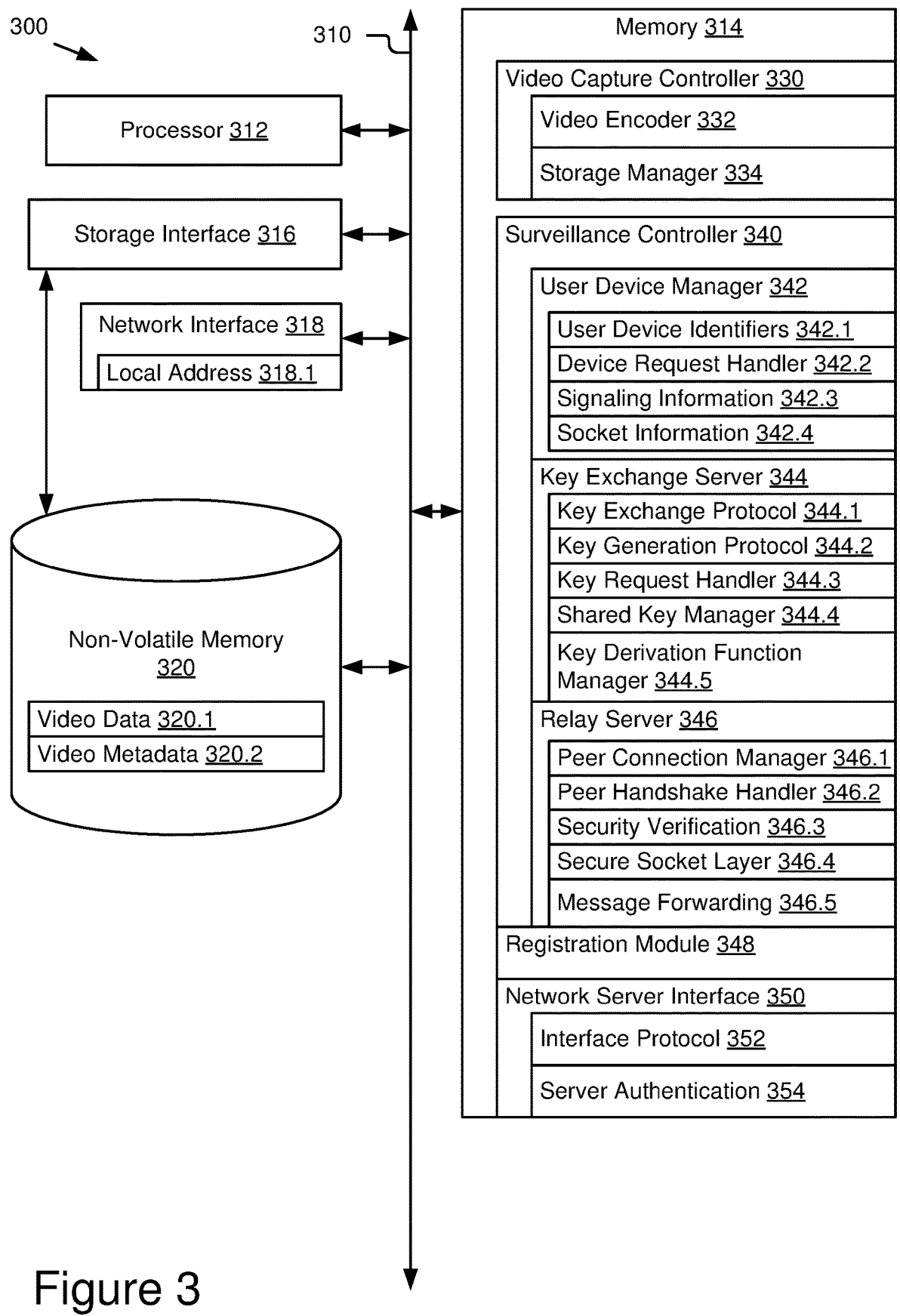
FIG. 3 schematically illustrates some elements of the computer-based surveillance system of FIG. 1.

FIG. 3 schematically shows selected modules of a surveillance system 300 with video cameras configured for facilitating a peer-to-peer network connection for sending encrypted video data to a user device. Surveillance system 300 may incorporate elements and configurations similar to those shown in FIGS. 1-2. For example, surveillance system 300 may be configured in a plurality of video cameras similar to video cameras 110 and 210 or other media devices. In some embodiments, one or more of the selected modules may access or be instantiated in the processors, memories, and other resources of video cameras configured for video capture, similar to video cameras 110. For example, a video camera and its embedded or attached data storage device may be configured with some or all functions of video capture controller 330, surveillance controller 340, and/or network server interface 350 to provide video data storage and peer-to-peer video streaming capabilities in a distributed fashion at the edge of surveillance system 300. In some embodiments, each video camera in surveillance system 300 may be configured with the elements shown in FIG. 3.

Surveillance system 300 may include a bus 310 interconnecting at least one processor 312, at least one memory 314, and at least one interface, such as storage interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks may be configured to monitor and share these resources.

Storage interface 316 may be configured to provide a data storage device for storing video data in each video camera. Storage interface 316 may include a physical interface for connecting to one or more internal and/or removable storage devices using an interface protocol that supports storage device access. For example, storage interface 316 may include a PCIe, SATA, SCSI, SAS, USB, Firewire, SD, extended secure digital (XSD), or similar storage interface connector supporting storage protocol access to some or all of non-volatile memory 320. Depending on the configuration and protocols used by storage interface 316, non-volatile memory 320 may include a corresponding interface adapter, firmware, and/or protocols for receiving, managing, and responding to storage commands from the video camera. In some embodiments, non-volatile memory 320 may include a removable data storage device, such as an SD card, and storage interface 316 may include hardware (slot and conductor configuration) and software for storing to and reading from the removable data storage device.

Network interface 318 may include one or more wired or wireless network connections to network, similar to network 102. Network interface 318 may include a physical interface, such as an ethernet port, and related hardware and software protocols for communication over the network, such as a network interface card or wireless adapter. In some embodiments, network interface 318 may connect a camera to a LAN or directly to a NAT device, such as a camera gateway, router, or network switch, for connecting to another network, such as the internet. Network interface 318 may be configured with one or more local network addresses 318.1 corresponding to one or more ports for sending and receiving network communications. In some embodiments, local network address 318.1 may be used by the NAT device and/or other surveillance system components connected to the NAT device for directing local network communication, with the NAT device providing one or more IP addresses for sending and receiving network communication over the internet.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within or attached to the video cameras for storing and accessing video data.

Surveillance system 300 may include a plurality of modules or subsystems that are stored and/or instantiated in memory 314 for execution by processor 312 as instructions or operations. For example, memory 314 may include a video capture controller 330 configured to enable each video camera to capture and store video streams for that camera. Memory 314 may include a surveillance controller 340 configured to stream video data to requesting devices, such as a VSaaS server, user device, or other component of surveillance system 300. Memory 314 may include a network server interface configured to provide a network interface for accessing and managing video data on the video cameras from a VSaaS server, video surveillance application, or other access point for a group of smart video cameras.

Video capture controller 330 may include interface protocols, functions, parameters, and data structures for capturing and storing video data within each video camera. For example, video capture controller 330 may be an embedded firmware application and corresponding hardware in a video camera configured to store video data for selective access through a VSaaS server and/or a video surveillance application on a user device. Video capture controller 330 may be configured as an interface between video data captured through the camera's video image sensor and in camera storage, such as non-volatile memory 320, for the encoded video stream.

Video capture controller 330 may include image sensor interface protocols and a set of functions, parameters, and data structures for receiving video streams from the video image sensors. For example, video capture controller 330 may include video data channels and related data buffers for managing at least one video data stream. In some embodiments, video capture controller 330 may include a plurality of hardware and/or software modules configured to use processor 312 and memory 314 to handle or manage defined operations of video capture controller 330. For example, video capture controller 330 may include a video encoder 332 and a storage manager 334.

In some embodiments, video capture controller 330 may include one or more video encoders 332 configured to encode video data, such as raw video data from the image sensor, in a desired video format. For example, video encoder 332 may receive raw video frames in accordance with a defined frame rate and resolution to generate a time-dependent video stream that may be further processed according to a selected video codec and corresponding compression scheme. In some embodiments, video encoder 332 may be configured to generate video data for a defined resolution, image size, frame rate, codec, compression factor, color/gray-scale, or other video format parameters.

Storage manager 334 may include storage interface protocols and a set of functions, parameters, and data structures for managing storage of video data in non-volatile memory 320, for later retrieval and use by the camera's onboard analytics, display through display controller, 340 and/or access, display, and/or transfer to other systems through network server interface 350. For example, storage manager 334 may write camera video stream data from video data buffers and/or storage path video data from video encoder 332 to non-volatile memory 320 as source video data 320.1.

In some embodiments, storage manager 334 may be configured to manage video storage space in non-volatile memory 320 in accordance with one or more data retention and/or data archiving schemes. For example, surveillance system 300 may support continuous and/or triggered recording of video data from associated cameras and storage manager 334 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 334 may also include a metadata manager to receive and store video metadata 320.2 as tags or metadata tracks in the video data or in an associated metadata table, file, or similar data structure associated with the corresponding video data objects. In some embodiments, storage manager 334 may be configured to store video metadata 320.2 descriptive of various video data features, including timing or timestamps (such as coordinated universal time (UTC) formatted time references), encoding parameters, content tags, navigation tags, and other information. For example, storage manager 334 may store, access, and/or generate manifest files descriptive of video data 320.1 and indexed by timestamps.

Surveillance controller 340 may include APIs and a set of functions, parameters, and data structures for facilitating encrypted video data transfer to other devices, such as a user device. For example, surveillance controller 340 may provide one or more interfaces for receiving media requests through network interface 318 and sending requested video data through network interface 318. In some embodiments, surveillance controller 340 may be configured to transfer video data to a user device using a relay server. For example, surveillance controller 340 may receive a connection request from a user device, directly or through a VSaaS server, establish a secure peer network connection with the user device, and stream video data for display on a browser of the user device. In some embodiments, surveillance controller 340 may establish the peer network connection to communicate media requests and responses to and from the user device using a different data transfer protocol than the data transfer protocols used by relay server 346 and the user device's web browser. For example, relay server 346 may be configured for HTTP/HTTPS data transfer of video data and metadata compliant with HTML5 and stream control transmission protocol (SCTP) data transfer may be used over a secure socket connection between the two devices. In some embodiments, surveillance controller 340 may include a plurality of hardware and/or software modules configured to use processor 312 and memory 314 to handle or manage defined operations of surveillance controller 340. For example, surveillance controller 340 may include a user device manager 342, a key exchange server 344, and a relay server 346.

User device manager 342 may include APIs and a set of functions, parameters, and data structures for managing peer network connection with one or more user devices. For example, user device manager 342 may be configured to receive user device connection requests and manage security, signaling, and socket establishment, as well as related reference information for establishing, maintaining, and terminating such connections. In some embodiments, user device manager 342 may operate in conjunction with network server interface 350 for receiving authorized connection requests and signaling channel information from a VSaaS server or similar authorization server. In some embodiments, user device manager 342 may operate in conjunction with relay server 346 for handshaking and negotiation of the peer network connection.

In some embodiments, user device manager 342 may be configured to use user device identifiers 342.1 for managing connection processing and related information for each user device that requests a connection. For example, each user device may have or be assigned a unique identifier when a new connection request is received by device request handler 342.2. In some embodiments, device request handler 342.2 may receive each new device connection request received through network server interface 350 and initiate a connection process corresponding to the connection request. For example, device request handler 342.2 may be configured to parse user device parameters, authorization parameters, signaling channel information and use that information to negotiate the new peer network connection. User device manager 342 may be configured to pass the user device identifier 342.1 and signaling channel information 342.3 to relay server 346 for establishing the secure socket connection. User device manager 342 may receive socket information 342.4 describing the peer network connection once relay server 346 has successfully established the requested connection with the user device.

Key exchange server 344 may include APIs and a set of functions, parameters, and data structures for responding to key exchange requests, such as requests from a user device to establish a secure peer-to-peer channel, such as using datagram transport layer security (DTLS). For example, key exchange server 344 may be configured to route network communication requests through the relay server 346. In some embodiments, key exchange server 344 may be configured with a key exchange protocol 344.1, a key generation protocol 344.2, a key request handler 344.3, a shared key manager 344.4, and a key derivation function manager 344.5. For example, a key exchange protocol 344.1 may define the steps needed to exchange keys to enable encrypted data. Because a new set of keys are generated by the key generation protocol 344.2 upon each new request between a user device and a video camera, the key request handler 344.3 may coordinate with the shared key manager 344.4 to ensure that out of band key exchange is done on a secure channel.

The key exchange protocol 344.1 may outline steps needed to establish the secure peer-to-peer channel. For example, the user device may send a request, via a relay server, to the camera to initiate a peer-to-peer channel for the key exchange required for secure transfer of data. After exchanging Interactive Connectivity Establishment configurations required for peer-to-peer communication, a secure peer-to-peer channel may be established using DTLS, for example. Then, the camera, based on the key exchange protocol 344.1, sends a session identifier (ID) to the client. The client signs the session ID using the Long Term Host Key that was generated during registration. Then the camera receives the signed session ID and verifies the session ID using the Long Term Device key. If verification is successful, the following out of band key exchange occurs. The camera generates a new set of ephemeral keys for Elliptic-curve Diffie-Hellman (ECDH) key exchange. The camera public key is sent to the client. Similarly, the client generates a pair of ephemeral keys for ECDH and sends the client public key to the camera. ECDH Key exchange followed by key derivation function, as done by the key derivation function manager 344.5, results in a shared key on both sides. With the shared key, stored by the shared key manager 344.4 in memory 314, encrypted data exchange may occur between the video camera and the user device.

In some embodiments, key exchange server 344 may be configured with a media stream protocol 344.1 defining the file formats, syntax, and parameters used for media requests, manifest files, and media transport files. For example, media stream protocol 344.1 may include .TS media transport stream files and HTML5 compatible media requests and manifest files for indexing time-based media streams. In some embodiments, media server 344 may be configured with a data transfer protocol 344.2 defining the messaging format and transport protocols for sending and receiving network communication. For example, data transfer protocol 344.2 may include HTTP/HTTPS data transfer over transmission control protocol/internet protocol (TCP/IP) or a local transport equivalent.

In some embodiments, media server 344 may include a media request handler 344.3 configured to receive and process media requests from a requesting browser. For example, media request handler 344.3 may receive media request messages from the user device and parse them to determine the media request type (such as manifest file request or media file request), target video data (based on a video stream or camera identifier and UTC time parameters, such as start and stop timestamps). If the media request is metadata request, media server 344 may use a manifest manager 344.4 to access and return the manifest file corresponding to the requested portion of the video stream (based on time indexing). If the media request is the streaming file request, media server 344 may use a media file manager 344.5 to access and return the transport stream file corresponding to the requested portion of the video stream.

Relay server 346 may include APIs and a set of functions, parameters, and data structures for relaying requests and responses using a standard data transfer protocol, such as hypertext transfer protocol (HTTP), rather than a secure peer-to-peer channel used by the key exchange server 344 and the user device. Because data will be encrypted, the camera and the user device may use an unsecured data transfer protocol for transferring the encrypted media data. For example, relay server 346 may be configured to send and receive communications to and from the camera using an internal transfer protocol, such as HTTP, and send and receive communications to and from a similarly configured user device.

In some embodiments, relay server 346 may include a connection manager 346.1 configured to establish the peer network connection with the user device to exchange keys as described above. For example, peer connection manager 346.1 may be configured as an endpoint for initiating a peer-to-peer channel between the respective devices based on the user device, security, and signaling channel information received from user device manager 342. In some embodiments, peer connection manager 346.1 may initiate a handshaking process using a peer handshake handler 346.2 and a signaling server. For example, peer handshake handler 346.2 may generate and send a connection offer and receive and process a connection answer using the signaling channel information and fingerprint. In some embodiments, relay server 346 may be configured to receive and process the connection offer and generate the connection answer. Once the handshake is successfully completed, peer connection manager 346.1 may initiate candidate logic to exchange and negotiate candidate network address and port information for establishing the secure socket connection. For example, candidate logic may enable the camera and the user device to exchange ICE candidates and establish mutual DTLS over UDP between the network interfaces of the respective devices, despite the intervening NAT device. In some embodiments, relay server 346 may use security verification 346.3 to verify security credentials, such as the fingerprint provided in the connection answer, to assure that the answer was received from the intended endpoint and peer network communications are properly secured. An example messaging process for establishing the peer network connection, as may be used by relay server 346 and the user device, may be further described with regard to FIG. 4a. In some embodiments, socket information 342.4 describing secure socket layer 346.4 established between the camera and the user device may be returned to user device manager 342 to confirm successful establishment of the peer network connection.

Once the peer network connection is established, either endpoint (user device or camera) may initiate key exchange requests between key exchange server 344 and the user device. For example, the user of the user device may request a target video stream and time window (start and stop timestamps) from the video camera using a video manager application or function. In some embodiments, relay server 346 may be configured for receiving messages, such as key exchange requests, from the user device and forward them to key exchange server 344. Similarly, relay server 346 may be configured to receive messages, such as responses from surveillance controller 340 and forward them to the user device using the peer network connection. In some embodiments, message forwarding 346.5 may be configured with routing information for key exchange server 344 and the user device to support message forwarding. Message forwarding 346.5 may further include or access encapsulation logic and/or reformatting logic for converting the messages into data transfer formats supported by respective data transfer protocols. For example, encapsulation logic may add HTTP/HTTPS headers around the content or payload of a request or response message to generate a proper HTTP/HTTPS request/response and reformatting logic may strip HTTP/HTTPS header information to forward only the payload through the secured SCTP connection. Messaging between key exchange server 344 and the user device may be further described with regard to FIG. 4b.

Network server interface 350 may include APIs and a set of functions, parameters, and data structures for interacting with a network video server, such as a VSaaS server. For example, network server interface 350 may include a monitoring or display configuration for displaying one or more video streams in real-time or near real-time on a graphical user display of a user device and/or receive video navigation commands from the user device to selectively display stored video data from non-volatile memory 320 through a VSaaS server. Network server interface 350 may be configured to support the surveillance application when instantiated in the a VSaaS server, end user device, network video recorder, or another system accessible via a network within a LAN, WAN, VPN, or the internet. In some embodiments, network server interface 350 may be configured to support an interface protocol 352 based on network communication through the NAT device to the VSaaS server and may include proprietary APIs and extensions to support the various functions of the VSaaS server, such as camera control, video capture, video storage/archiving, video analysis and event detection, and selective display through one or more user devices. In some embodiments, network server interface 350 may provide an alternate path for accessing and displaying video data from cameras, compared to the peer network connection supported by surveillance controller 340.

Network server interface 350 may include a server authentication function 354 for validating remote access to and from the video cameras. For example, secure connection to a VSaaS server and/or surveillance applications running on another device (such as an end user device) may require each video camera to be configured with a set of mutually authenticated credentials for each remote connection. In some embodiments, a set of camera credentials and/or account credentials for the camera group may be provided to each camera, along with encryption keys or similar security elements, as well as network server identifier, such as a server name, internet protocol (IP) address, or other network routing information. For example, the set of credentials may enable an initial connection or configuration session and generate a secure authentication token stored to each video camera and/or a gateway for accessing the camera group to enable automatic initiation of a secure data transfer connection between the video cameras and the surveillance application (and its hosting device or devices).

In some embodiments, the surveillance application may include a plurality of hardware and/or software modules configured to use a processor and a memory to handle or manage defined operations of the surveillance application. For example, the surveillance application may include a video manager, an alert manager, and an analytics manager.

The video manager may include APIs and a set of functions, parameters, and data structures for navigating and displaying video streams from the video cameras and stored through video capture controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to an analytical model library for one or more analytics engines, either in-camera analysis subsystems or off-camera analytics engines, such as those supported by the VSaaS server. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with an analytics engine for selecting, training, managing, and using the event detection algorithms configured through the analytics manager.

Figure 4A:
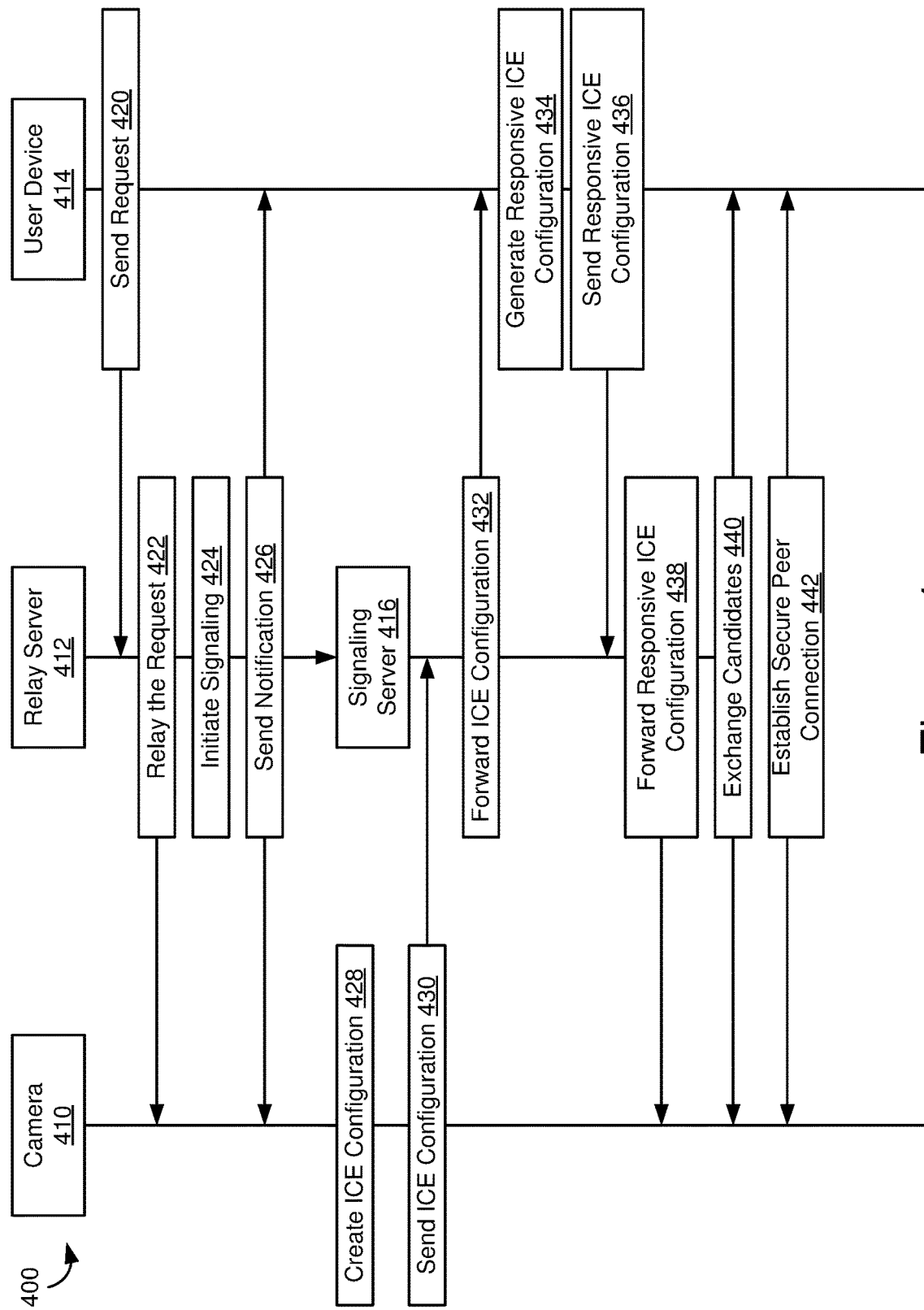
FIGS. 4a and 4b schematically illustrate example communications among components of the computer-based surveillance system of FIG. 1 to establish a secure peer network connection for exchanging keys out of band.
Figure 4B:
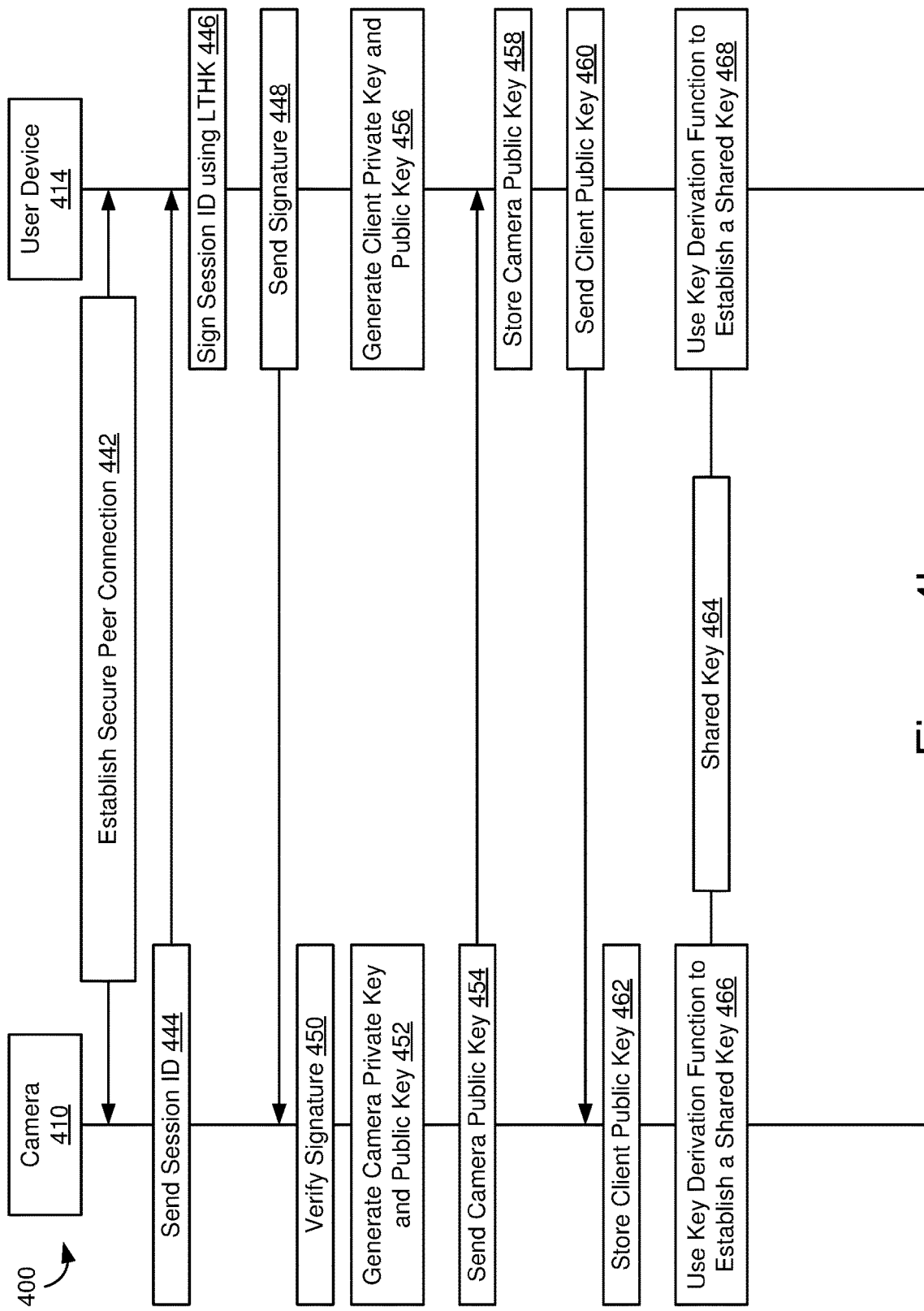

FIGS. 4a and 4b shows example communication among components of a computer-based surveillance system 400, such as the computer-based surveillance systems of FIGS. 1-3, to establish a peer network connection for out of band key exchange. Communications among camera 410, relay server 412, user device 414, and signaling server 416 may enable user device 414 and camera 410 to establish a mutual peer network connection using a secure data transfer protocol through a hole punching mechanism to compensate for any NAT devices between them. In some embodiments, relay server 412 and/or signaling server 416 may be hosted by a VSaaS server similar to those described with regard to FIGS. 1 and 2.

In the example shown, the user device may initiate the communication process by sending a connection request to the relay server at block 420. For example, a user of the user device 414 may request encrypted video data stored on camera 410 through a surveillance application or the user may access a configuration manager to establish the peer network connection for later use in requesting encrypted video data. Note that the process may be initiated from user device 414, camera 410, and/or another system, such as a VSaaS server, particularly during a setup or configuration process for computer-based surveillance system 400 and the endpoint roles and corresponding operations of camera 410 and user device 414 may be reversed in some embodiments.

Relay server 412 may receive the connection request sent at block 420. Relay server 412 may relay the connection request at block 422. For example, relay server 412 may forward the request to the camera 410. In some embodiments, relay server 412 may identify video camera 410 from the connection request and may reformat the connection request for the interface protocol used to communicate with camera 410, such as the protocol used by the VSaaS server for managing communications with cameras in the surveillance system (e.g., message queuing telemetry transport (MQTT) protocol). At block 424, relay server 412 may initiate signaling server 416 with network address information and/or other endpoint information for both camera 410 and user device 414 and determine a signaling channel through signaling server 416 for use by camera 410 and user device 414 to use for establishing the peer network connection. At block 426, relay server 412 may send an authorized connection notification to camera 410 that includes parameters from the connection request, as well as authorization information and the signaling channel information. At block 426, notifications of the signaling channel information may also be sent to user device 414 and/or signaling server 416. In some embodiments, after signaling server 416 is initiated at block 426, signaling server 416 may determine and provide the signaling channel information to authentication server 412 and/or camera 410 and user device 414 and the signaling channel information may be sent separately from the authorized connection notification to camera 410.

At block 428, camera 410 may create a security certificate for establishing the secure peer network connection, or an interactive connectivity establishment (ICE) configuration. For example, camera 410 may generate or be configured with a private-public key pair that may be used to generate a DTLS certificate containing the public key as the payload. Camera 410 may generate a fingerprint by calculating a hash of the signed security certificate and, at block 434, add the fingerprint to a connection offer message. At block 430, camera 410 may send the ICE configuration to the signaling server using the signaling channel information to determine the destination address for the signaling channel. In some embodiments, sending the ICE configuration to signaling server 416 may initiate a handshaking process between camera 410 and user device 414, using signaling server 416 as an intermediary.

At block 432, signaling server 416 may forward the ICE configuration from camera 410 to user device 414 using the addressing information provided by relay server 412 when the signaling channel was initiated. At block 434, user device 414 may respond to receiving the ICE configuration by generating a responsive ICE configuration. At block 436, user device 414 may send the responsive ICE configuration to the signaling server for forwarding back to camera 410. At block 438, signaling server 416 may forward the responsive ICE configuration to camera 410 to complete the handshaking process and enable camera 410 and user device 414 for mutual communication. At block 440, camera 410 and user device 414 may exchange candidate network address and port information to negotiate at least one secure socket connection between the two devices. At block 442, negotiation of the secure socket connection between camera 410 and user device 414 may conclude and the secure peer connection may be established for mutual DTLS over UDP.

FIG. 4b continues to show example communication among components of a computer-based surveillance system 400, such as the computer-based surveillance systems of FIGS. 1-3, to establish a peer network connection for out of band key exchange. Because a secure peer connection was established at block 442, the camera 410 and user device 414 may communicate over the established secure peer-to-peer channel. At block 444, the camera 410 sends a session identifier (ID) to the user device 414 through the secure peer-to-peer channel. The session ID may be generated by the camera 410 via a key exchange protocol, as described with respect to FIG. 3. At block 446, the user device 414 generates a signature for the session ID using the long-term host key (LTHK) generated and received at registration of the camera 410 as described with respect to FIG. 2. At block 448, the signature (e.g., signed session ID) is sent from the user device 414 to the camera 410 through the secure peer-to-peer channel. At block 450, the signature is verified by the camera 410 using the long-term device key (LTDK) generated during registration of the camera, as described above with respect to FIG. 2. After the signature is verified, a new set of ephemeral keys may be generated at both the camera 410 and the user device 414 to prepare for ECDH Key Exchange. At block 452, the camera 410 generates a public key and a private key. At block 454, the camera 410 sends the camera public key to the user device 414. At block 456, the user device generates a public key and a private key. At block 458, the user device stores the camera public key. At block 460, the user device 414 sends the client public key to the camera 410. At block 462, the camera 410 stores the client public key. At block 464, a shared key can be generated at both the camera 410 and the user device 414. At block 466, the camera 410 uses a key derivation function to generate and establish the shared key. At block 468, the user device 414 uses a key derivation function to generate and establish the shared key.

Figure 5:
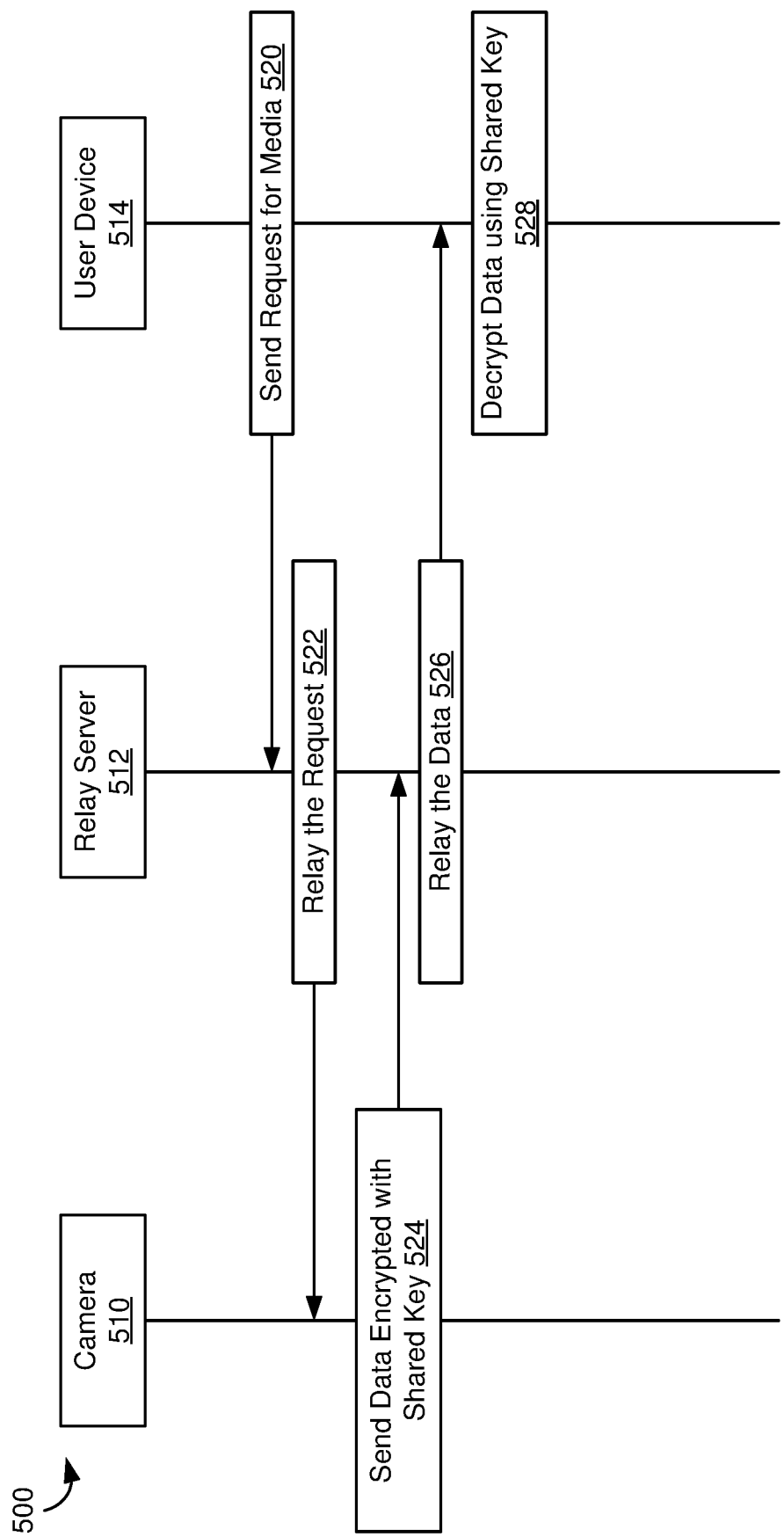
FIG. 5 schematically illustrates example communications among components of the computer-based surveillance system of FIG. 1 for transferring encrypted video data between the components of the computer-based surveillance system via a relay server.

FIG. 5 show example communications among components of a computer-based surveillance system 500, such as the surveillance systems of FIGS. 1-4, for transferring encrypted video data between the components of the computer-based surveillance system via a relay server. For example, a video camera 510, such as video cameras 110, 210, and 410, exchanges messages with user device 514, such as user device 170, 270, and 414 via a relay server 512. In FIG. 5, user device 514 initiates a media request over a network connection, such as HTTP, to a relay server 512, which forwards the media request to the camera 510. Because the camera 510 and user device 514 have already exchanged keys and have established a shared key, as described above with respect to FIG. 4, the media request does not need to be sent over a secured connection. The camera 510 retrieves the manifest file and encrypts it using the shared key, thus generating a response with the encrypted manifest file.

At block 520, user device 514 sends a media request to relay server 512 using HTTP data transfer. At block 522, relay server 512, the media request may be relayed to camera 510 using HTTP data transfer. At block 524, camera 510 may send the data encrypted with shared key. At block 526, the relay server 512 relays the sent data to the user device 514. At block 528, the user device 514 decrypts the data using the shared key.

Figure 6A:
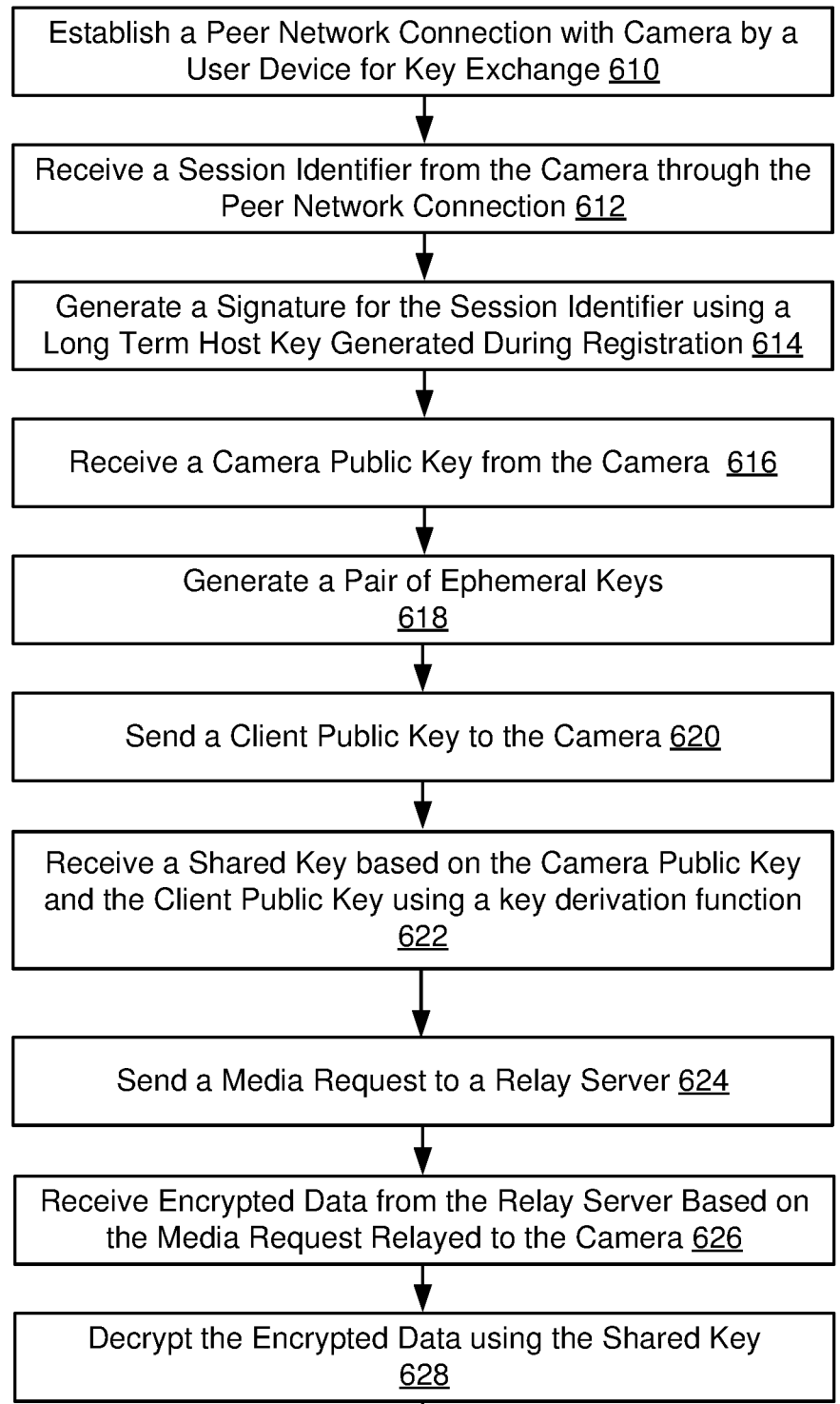
FIGS. 6a and 6b are flowcharts of example methods of establishing a secure peer network connection for facilitating encrypted data transfer from a video camera to a user device through a relay server.
Figure 6B:
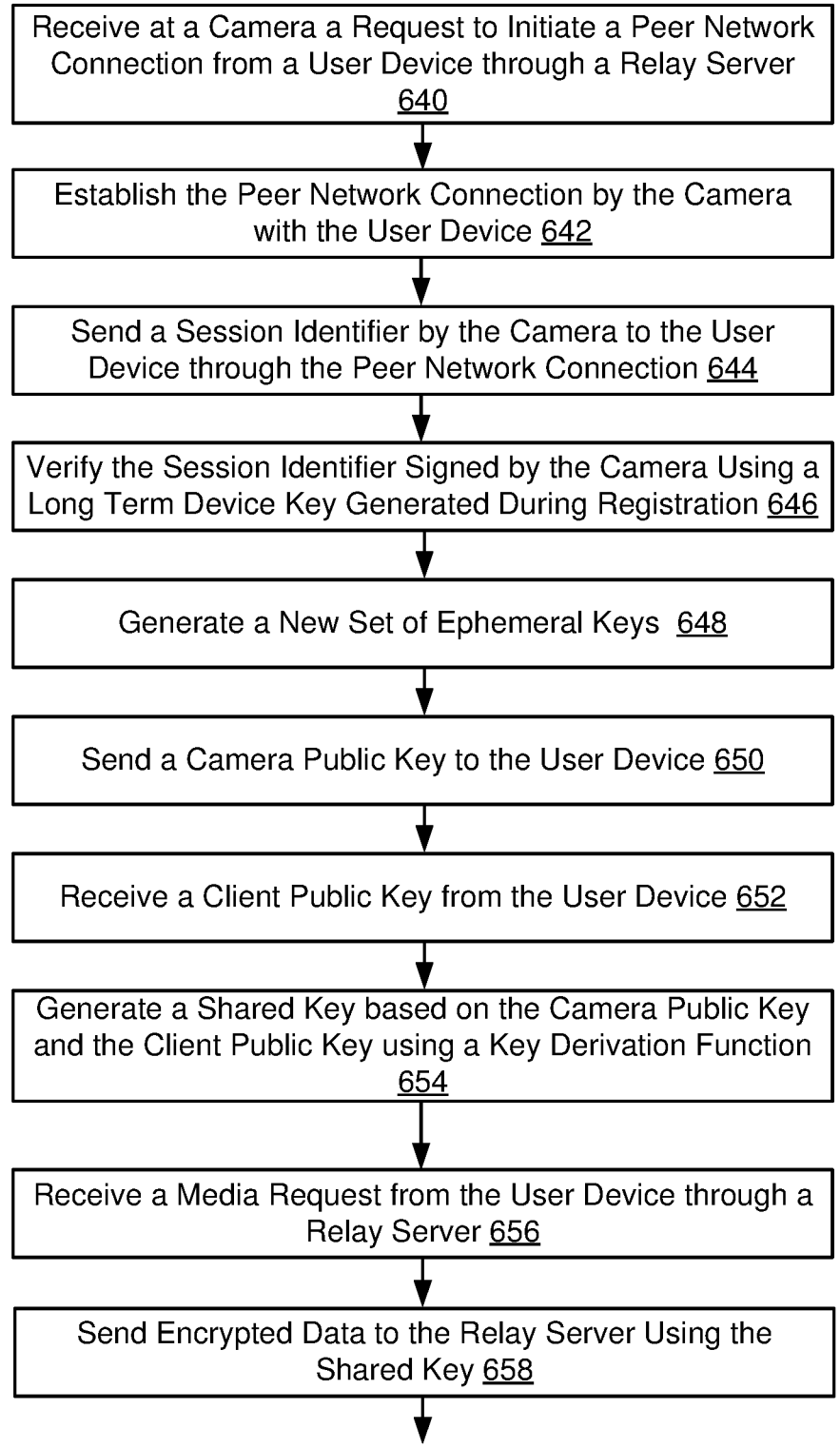

As shown in FIGS. 6a and 6b, surveillance system 300 may be operated according to example methods of establishing a secure peer network connection for facilitating encrypted data transfer from a video camera to a user device through a relay server, i.e., according to method 600 illustrated by blocks 610-628 and method 630 illustrated by blocks 640-658 in FIGS. 6a and 6b, respectively.

At block 610, a peer network connection may be established between the video camera and the user device for key exchange. For example, the user device may initiate a peer network connection, such as through a relay server and signaling server, and negotiate a secure, mutual peer-to-peer data transfer connection between the camera and the user device.

At block 612, a session identifier may be received by the user device from the camera through the peer network connection. For example, the camera may send the session identifier to the user device through the secure peer-to-peer channel that was established in block 610.

At block 614, a signature for the session identifier may be generated using a long term host key generated during registration. For example, the session identifier may be signed using the long term host key that was generated upon the user device registering the camera, or otherwise installing the video camera.

At block 616, a camera public key is received from the camera. For example, the camera public key may be received by the user device over the peer network connection, the secure peer-to-peer channel established in block 610.

At block 618, a pair of ephemeral keys are generated at the user device. For example, the user device generates the pair of ephemeral keys after signing the session identifier to prepare for the ECDH key exchange.

At block 620, a client public key may be sent to the camera by the user device. For example, the pair of ephemeral keys generated at block 618 includes the client public key that is sent to the camera over the secure peer-to-peer channel established at block 610.

At block 622, a shared key is received based on the client public key and the camera public key using a key derivation function. For example, the shared key may be received at the user device using a key derivation function that uses the client public key and the camera public key to generate the shared key.

At block 624, a media request is sent to a relay server for forwarding to the camera. For example, the user device may send an HTTP media request to the relay server.

At block 626, encrypted data from the relay server may be received based on the relayed media request to the camera. For example, the encrypted data may be received as an HTTP response to the media request relayed by the relay server to the camera.

At block 628, the encrypted data may be decrypted using the shared key. For example, the encrypted data, which includes the requested manifest file in the media request, can be decrypted using the shared key that was generated at block 622.

FIG. 6b illustrates the method 630 of establishing a secure peer network connection for facilitating encrypted data transfer from a video camera to a user device through a relay server, shown in blocks 640-658.

At block 640, a request to initiate a peer network connection may be received at a camera from a user device through a relay server. For example, the camera may receive the request sent by the user device, through the relay server, to initiate the peer network connection to establish a secure peer-to-peer channel for out of band key exchange.

At block 642, the peer network connection may be established by the camera with the user device. For example, as described above, various tasks may be performed to establish the peer network connection for a secure peer-to-peer channel.

At block 644, a session identifier may be sent by the camera to the user device through the peer network connection. For example, the session identifier may be a unique identifier associated with a new session between the camera and the user device to prepare for out of band key exchange.

At block 646, a signed session identifier received from the user device through the peer network connection may be verified by the camera using a long term device key generated during registration. For example, the camera may verify the signed session identifier using the long term device key that was stored at the camera during registration, or installation, of the camera.

At block 648, a new set of ephemeral keys may be generated. For example, the camera may generate a new set of ephemeral keys after the signed session identifier is verified. The new set of ephemeral keys includes a private key and a public key. A new set of ephemeral keys may be generated for each request to the camera for media, in an embodiment. This creates a new layer of security for encrypting data based on the ephemeral keys.

At block 650, a camera public key may be sent to the user device. For example, the camera public key is one of the new set of ephemeral keys generated at block 648 by the camera.

At block 652, a client public key may be received from the user device. For example, the client public key is generated by the user device in preparation for out of band key exchange.

At block 654, a shared key may be generated based on the camera public key and the client public key using a key derivation function. For example, the camera may generate the shared key using a key derivation function based on the camera public key and the client public key.

At block 656, a media request may be received from the user device via a relay server. For example, the media request may be forwarded by the relay server, where the media request includes a request for video data stored at the camera.

At block 658, encrypted data may be sent to the relay server using the shared key. For example, the requested video data may be retrieved and then encrypted using the shared key before being sent to the relay server, which will relay the encrypted video data in response to the request from the user device.

Figure 7:
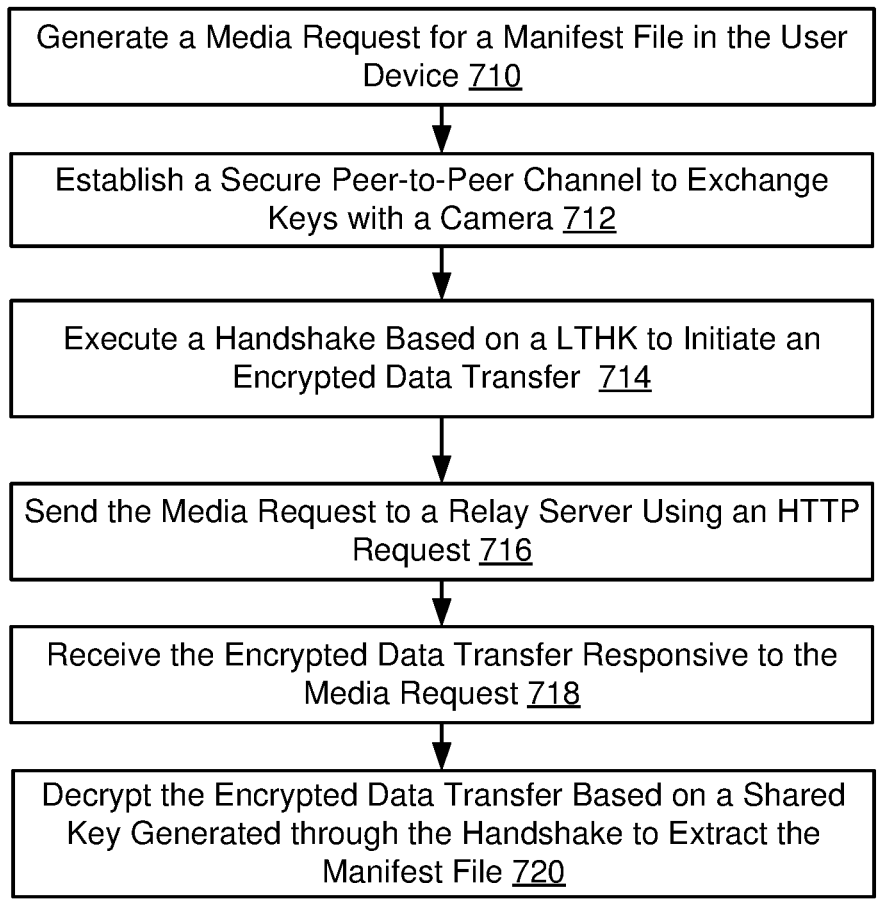
FIG. 7 is a flowchart of an example method of establishing a secure peer network connection for facilitating encrypted data transfer from a video camera to a user device through a relay server.

As shown in FIG. 7, surveillance system 300 may be operated according to an example method for establishing a secure peer network connection for facilitating encrypted data transfer from a video camera to a user device through a relay server, i.e., according to method 700 illustrated by blocks 710-720 in FIG. 7.

At block 710, a media request for a manifest file may be generated at a user device. For example, a media request for a manifest file may be generated at the user device, such as through a surveillance application operating on the user device or an internet browser accessing a web application operating on the user device. The user device may include an internet browser running a surveillance application and the user may select a video camera, to access media data stored on the video camera.

At block 712, a secure peer-to-peer channel may be established to exchange keys with a camera. For example, the user device may initiate a peer network connection request, as described above, to establish the secure peer-to-peer channel with the camera.

At block 714, a handshake may be executed based on a long term host key to initiate an encrypted data transfer. For example, the handshake may include signing a session identifier with the long term host key to establish the secure peer-to-peer channel with the camera using DTLS over UDP.

At block 716, the media request may be sent to a relay server using an HTTP request. For example, the user device may send the media request in the payload for HTTP data transfer and send the HTTP media request to the relay server for forwarding to the camera.

At block 718, an encrypted data transfer may be received responsive to the media request. For example, the encrypted data transfer may include the requested media in a manifest file, encrypted by a shared key as described above based on ECDH key exchange and key derivation function.

At block 720, the encrypted data transfer may be decrypted based on a shared key generated through the handshake to extract a manifest file at the user device. For example, the handshake of block 714 resulted in the key exchange and key derivation that led to a shared key which can be used to decrypt the encrypted data transfer.

Figure 8:
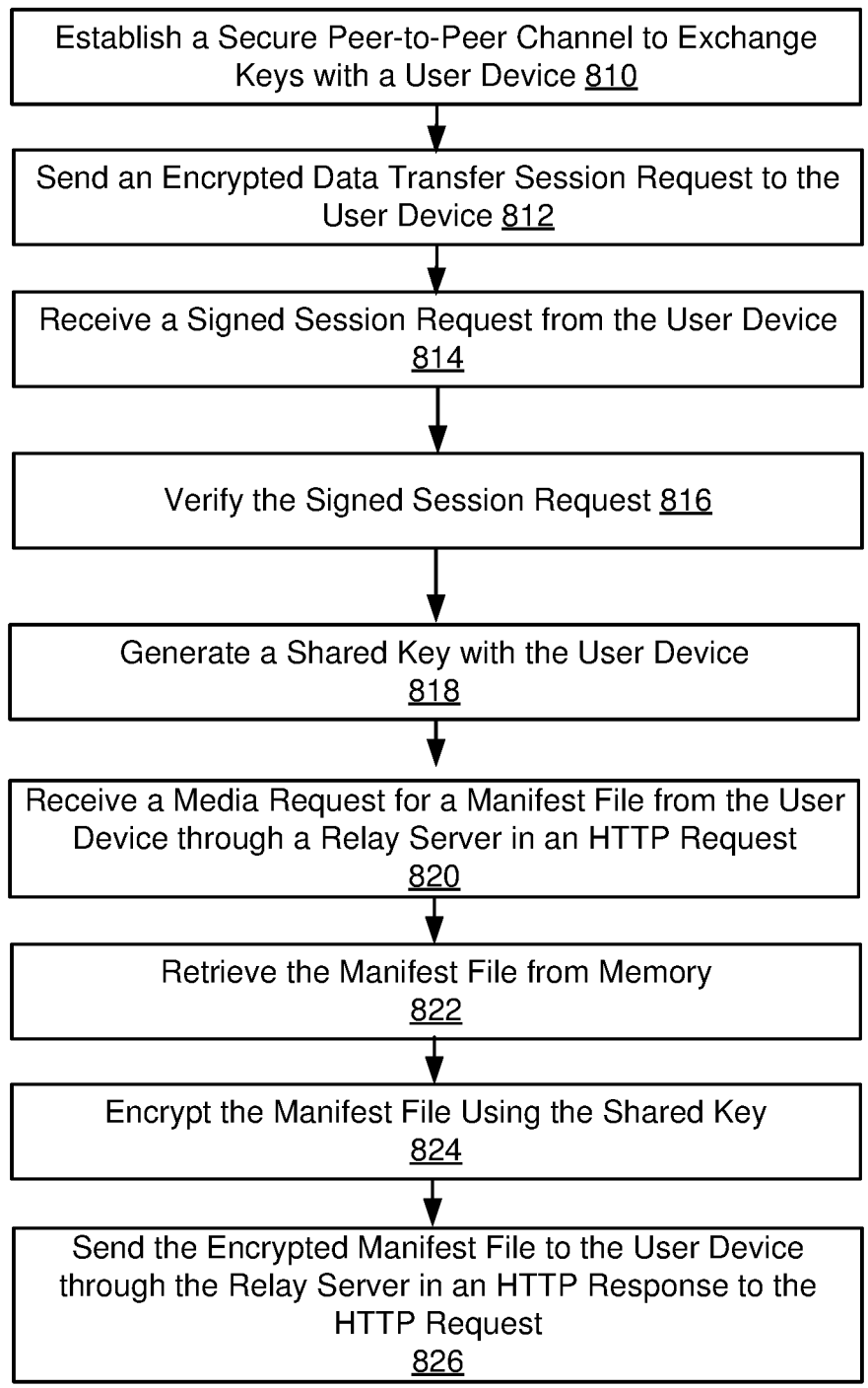
FIG. 8 is a flowchart of an example method of establishing a secure peer network connection for facilitating encrypted data transfer from a video camera to a user device through a relay server.

As shown in FIG. 8, surveillance system 300 may be operated according to an example method for establishing a secure peer network connection for facilitating encrypted data transfer from a video camera to a user device through a relay server, i.e., according to method 800 illustrated by blocks 810-826 in FIG. 8.

At block 810, a secure peer-to-peer channel may be established to exchange keys with a user device. For example, the secure peer-to-peer channel may be established as described above.

At block 812, an encrypted data transfer session request may be sent to user device. For example, the camera may send a session identifier as part of the encrypted data transfer session request to the user device.

At block 814, a signed session request may be received from the user device. For example, the signed session request may be received via the secure peer-to-peer channel, such as DTLS over UDP.

At block 816, the signed session request may be verified. For example, the signed session request is verified using the long term device key generated during installation, as described above.

At block 818, a shared key may be generated with the user device. For example, the shared key may be generated based on a set of ephemeral keys generated at both the camera and the user device, where the public keys are exchanged out of band via the secure peer-to-peer channel.

At block 820, a media request for a manifest file may be received from the user device through a relay server in an HTTP request. For example, the media request may be received from the surveillance application operating on the user device, where the media request includes identifying information of a manifest file stored at the camera to be encrypted and sent via the relay server over HTTP.

At block 822, the manifest file may be retrieved from memory. For example, the manifest file may be retrieved from memory or retrieved from a data storage device on the camera and transferred to memory.

At block 824, the manifest file may be encrypted using the shared key. For example, the manifest file may be encrypted by a module on the camera using the shared key.

At block 826, the encrypted manifest file may be sent to the user device via the relay server in an HTTP response to the HTTP request. For example, the encrypted manifest file may be embedded in the payload of the HTTP response to the HTTP request received from the relay server at block 820.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:
1. A system, comprising:
 a video camera comprising:
  a processor;
  a memory;
  a network interface configured for communication over a network;

a data storage device configured to store video data; and a surveillance controller, stored in the memory for execution by the processor, configured to:
receive, from a user device through a relay server, a peer-to-peer connection request;
establish, responsive to the peer-to-peer connection request, a connection to a signaling server, wherein the connection is configured for exchanging a connectivity configuration associated with opening a secure peer-to-peer channel between the user device and the video camera;
establish the secure peer-to-peer channel with the user device;
send a session identifier to the user device via the secure peer-to-peer channel;
receive a signed session identifier from the user device;
verify the signed session identifier;
generate a camera public key associated with the user device;
send, to the user device via the secure peer-to-peer channel, the camera public key;
receive, from the user device via the secure peer-to-peer channel, a client public key;
store, in the memory, the client public key in association with the camera public key;
generate a shared key based on the camera public key and the client public key; and
encrypt, using the shared key, requested video data from the video camera.

2. The system of claim 1, further comprising:
a registration module configured to receive a long-term device key from the user device upon installation, wherein the surveillance controller is further configured to verify the signed session identifier using the long-term device key.

3. The system of claim 2, further comprising:
the user device configured to:
generate a long-term host key and the long-term device key upon registration; and
sign the session identifier using the long-term host key.

4. The system of claim 1, further comprising:
the user device comprising a network server interface configured to:
receive, from the relay server, a user device notification indicating a signaling server for establishing the secure peer-to-peer channel;
receive, forwarded from the signaling server, an Interactive Connectivity Establishment (ICE) configuration of the video camera;
generate a responsive ICE configuration;
send the responsive ICE configuration to the signaling server;
receive exchanged candidates; and
establish the secure peer-to-peer channel.

5. The system of claim 4, wherein the user device further comprises a video manager configured to:
send a media request for a manifest file to the video camera via the relay server;
receive data encrypted from the video camera via the relay server responsive to the media request; and
decrypt the data using the shared key to extract the manifest file.

6. The system of claim 1, wherein the shared key is generated using a key derivation function.

7. The system of claim 1, wherein the relay server is configured to receive requests through a hypertext transfer protocol (HTTP).

8. The system of claim 1, wherein:
the network interface is configured to receive network communication from a network address translation device using a local network address; and
establishing the secure peer-to-peer channel comprises establishing a secure Datagram Transport Layer Security (DTLS) protocol between the video camera and the user device.

9. The system of claim 1, wherein the surveillance controller is further configured to, responsive to a request via the relay server:
retrieve a manifest file from the data storage device;
encrypt the manifest file using the shared key; and
send the encrypted manifest file to the relay server.

10. The system of claim 1, wherein the relay server comprises an authentication controller configured to authenticate the user device and the video camera to initiate the secure peer-to-peer channel.

11. A computer-implemented method, comprising:
establishing, between a video camera and a user device, a peer network connection using a Datagram Transport Layer Security (DTLS) protocol;
sending an encrypted data transfer session request to the user device;
receiving a signed session request from the user device;
verifying the signed session request;
generating a shared key with the user device;
receiving a media request for a manifest file through a relay server in a hypertext transfer protocol (HTTP) request;
retrieving the manifest file;
encrypting the manifest file using the shared key; and
sending the encrypted manifest file to the relay server in an HTTP response to the HTTP request.

12. The computer-implemented method of claim 11, wherein:
the video camera comprises:
at least one image sensor configured to capture video images;
a processor;
a memory;
a network interface configured for communication over a network; and
a data storage device configured to store video data captured by the at least one image sensor; and
the manifest file includes video data stored in the data storage device.

13. The computer-implemented method of claim 11, further comprising:
receiving, by the video camera, network communication from a network address translation device using a local network address for the video camera; and
establishing, for the peer network connection, a secure socket between the video camera and the user device.

14. The computer-implemented method of claim 11, wherein generating the shared key includes using a key derivation function.

15. The computer-implemented method of claim 14, further comprising:
exchanging, for the peer network connection, a plurality of combinations of network addresses and ports for:
the video camera; and
the user device; and implementing a transport layer security protocol compatible with the peer network connection.

16. The computer-implemented method of claim 11, further comprising:
receiving, by the relay server, a media connection request from the user device;
authenticating, by the relay server, the media connection request based on at least one public key associated with the media connection request;
determining, by the relay server and based on the media connection request, a target camera identifier from a plurality of camera identifiers supported by the relay server, wherein the target camera identifier corresponds to the video camera;
sending, by the relay server and based on the media connection request, a user device notification to the video camera; and
initiating, by the relay server, a signaling server to support negotiation of the peer network connection between the video camera and the user device.

17. The computer-implemented method of claim 16, further comprising:
determining, by the relay server, signaling channel information for a signaling channel;
sending, by the relay server, the signaling channel information to the video camera and the user device;
establishing, by the signaling server, the signaling channel for use by the video camera and the user device; and
exchanging, by the signaling server, interactive connectivity establishment (ICE) configurations between the video camera and the user device.

18. The computer-implemented method of claim 11, wherein:
retrieving the manifest file is from a data storage device in the video camera; and
generating the shared key is through an elliptic-curve Diffie-Hellman (ECDH) key exchange.

19. The computer-implemented method of claim 11, further comprising:

generating, by the user device, a long-term host key and a long-term device key upon registration; and
receiving the long-term device key from the user device upon installation, wherein verifying the signed session request uses the long-term device key.

20. A video camera, comprising:
a processor;
a memory;
a network interface configured for communication over a network;
a data storage device configured to store video data;
means for receiving, from a user device and through a relay server, a peer-to-peer connection request;
means for establishing, responsive to the peer-to-peer connection request, a connection to a signaling server, wherein the connection is configured for exchanging a connectivity configuration associated with opening a secure peer-to-peer channel between the user device and the video camera;
means for establishing the secure peer-to-peer channel with the user device;
means for sending a session identifier to the user device via the secure peer-to-peer channel;
means for receiving a signed session identifier from the user device;
means for verifying the signed session identifier;
means for generating a camera public key associated with the user device;
means for sending, to the user device and via the secure peer-to-peer channel, the camera public key;
means for receiving, from the user device and via the secure peer-to-peer channel, a client public key;
means for storing, in the memory, the client public key in association with the camera public key;
means for generating a shared key based on the camera public key and the client public key; and
means for encrypting requested video data from the video camera using the shared key.

* * * * *